June 30, 1970 C. RENSHAW ET AL 3,517,513
FRESH-WATER CISTERN
Filed July 31, 1968 2 Sheets-Sheet 1
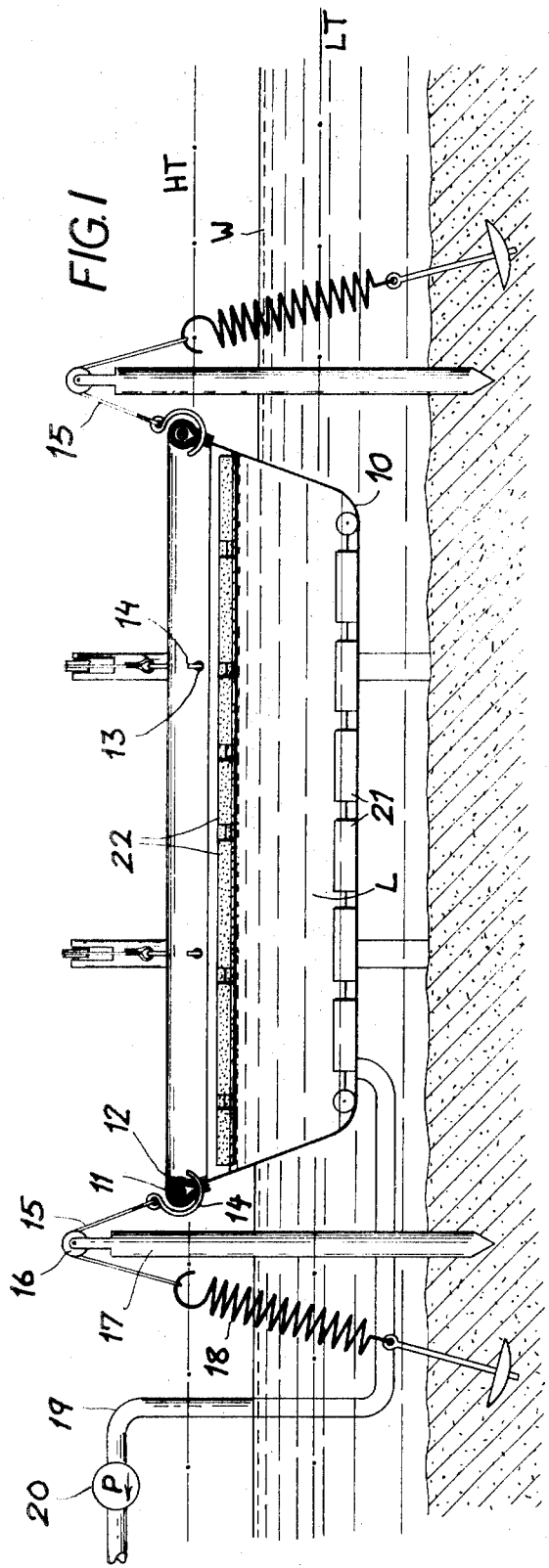
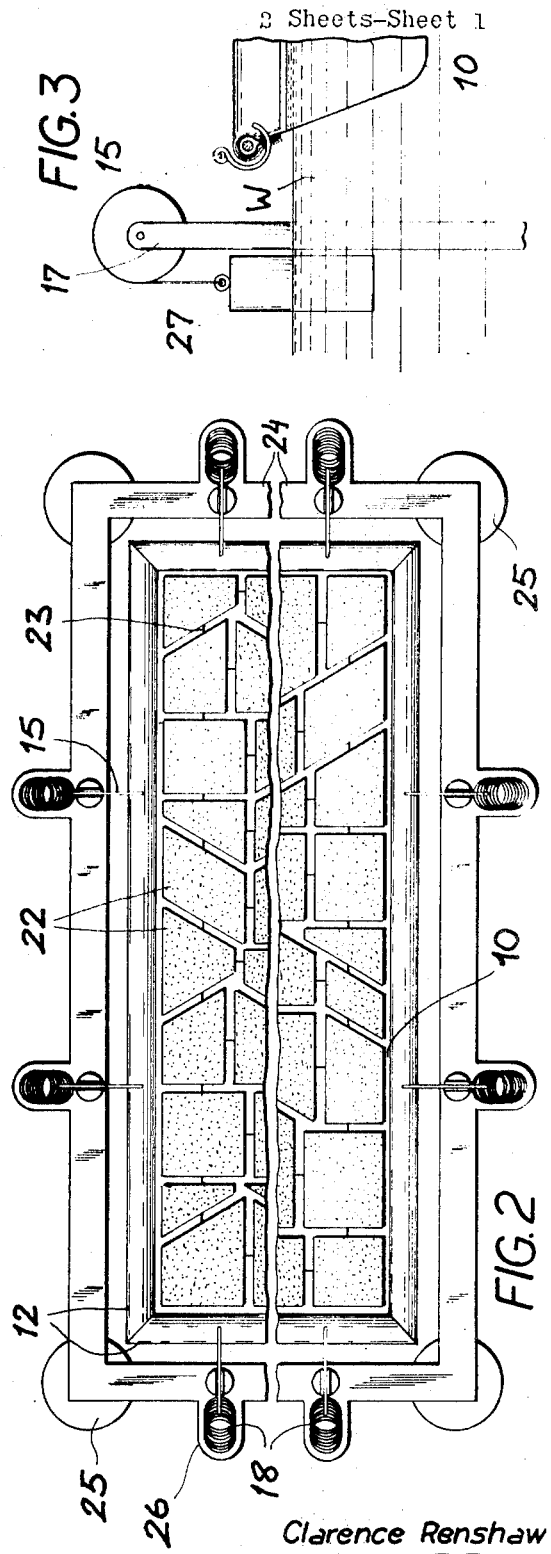
Clarence Renshaw
Juan T. Trippe
INVENTORS.
BY Karl F. Ross
ATTORNEY

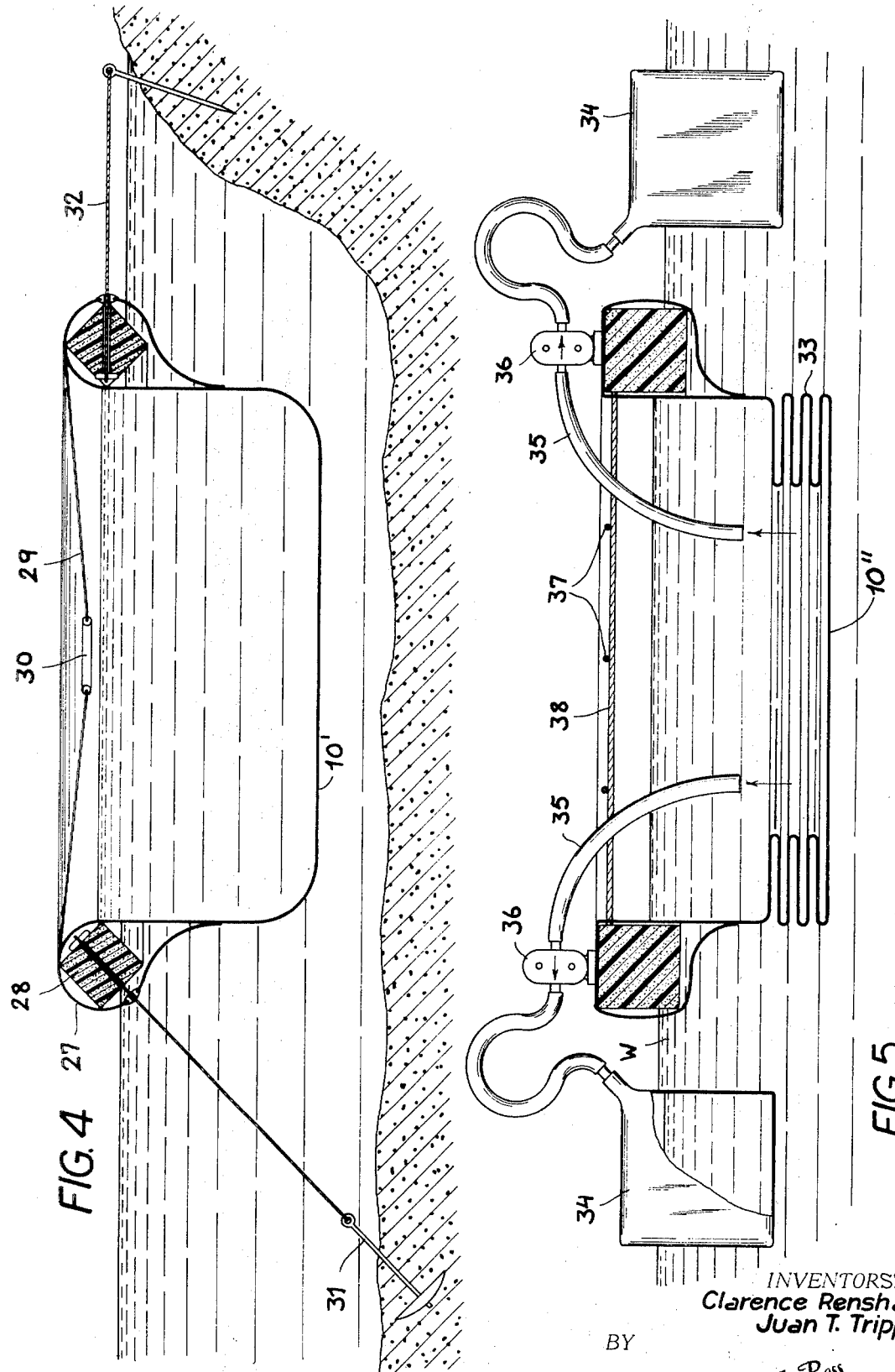

United States Patent Office 3,517,513
Patented June 30, 1970

3,517,513
FRESH-WATER CISTERN
Clarence Renshaw, 45 Sutton Place S. 10020, and Juan T. Trippe, 10 Gracie Square 10028, both of New York, N.Y.
Filed July 31, 1968, Ser. No. 749,214
Int. Cl. B65g 5/00
U.S. Cl. 61—1     8 Claims

ABSTRACT OF THE DISCLOSURE

A water reservoir of light-weight sheet material is partly submerged in a body of nonpotable water and anchored or suspended from yieldable moorings to rise and fall with the tides and/or with changing volume of collected rain water whereby the latter is stored by flotation on the underlying liquid body.

---

Our present invention relates to a system for collecting and storing rain water in regions lacking an adequate normal fresh-water supply while disposing over substantial areas covered by bodies of saline or otherwise nonpotable water; such regions include, for example, tropical and subtropical islands as well as swamplands.

The general object of our invention is to provide simple, inexpensive and readily transportable means for collecting and storing fresh water at locations, such as tide waters, ponds or lakes, not otherwise useful for commercial, residential or industrial purposes.

A more particular object of this invention is to provide means for conserving a maximum of fresh water accumulated at such locations.

These objects, pursuant to our present invention, are realized by the provision of a floating cistern in the form of an upwardly open (or partially open) water reservoir of impermeable sheet material partly submerged in a body of nonpotable water, such as a river delta, a lagoon, a bay or an open stretch of ocean, this reservoir being so anchored or moored as to rise and fall with tides and/or with changing volume of collected rain water. The moorings may include stationary piers or posts driven into the ground around or below the body of water surrounding the reservoir or, in the case of a seagoing cistern, may be constituted by a floating frame. In either case we may make the reservoir of rubber or some other elastomeric substance, capable of stretching to accommodate increased volumes of collected water, and/or we may facilitate volume changes by using corrugated or pleated sheet material. We may also employ a force (e.g. counterweights or springs) permitting a limited adjustment in the relative elevation of the upper rim of the reservoir above the surrounding water level. In order to stabilize the reservoir in its empty or nearly empty state against uplift by atmospheric disturbances, its bottom may be suitably weighted along its periphery.

According to another feature of our invention, evaporation is limited by the deposition of a floating layer of inert matter on the collected liquid, advantageously an array of spacedly interconnected slabs of light-weight resinous or ceramic material. A preferred type of slab consists of polystyrene foam. Alternatively, especially in the case of smaller installations, a funnel-shaped cover with a relatively small central aperture may be stretched across the top of the reservoir.

In accordance with still another aspect of our invention, we provide one or more auxiliary receptacles to be used as floating containers for some or all of the rain water collected in the cistern, these containers being connected with the reservoir through rigid or flexible conduits and being otherwise closed against the atmosphere; the conduits may be equipped with pumps for transferring the water from the reservoir to the containers which may then be hauled ashore, emptied and returned to their station near the cistern.

The invention will be described in greater detail with reference to the accompanying drawing in which:

FIG. 1 is a sectional elevational view of a cistern embodying our invention;

FIG. 2 is a top view of a cistern similar to that of FIG. 1;

FIG. 3 is a fragmentary side view illustrating another modification; and

FIGS. 4 and 5 are further views similar to FIG. 1, showing still other embodiments.

In FIG. 1 we have shown a body of relatively shallow nonpotable water W, such as tide water, subject to level changes between low tide (LT) and high tide (HT). Floatingly suspended in this body of water is an upwardly open reservoir of sheet rubber or other preferably elastomeric sheet material impervious to liquid. The edges of the sheet are bent around a reinforcing pipe 11 and clamped in tubular clips 12, the assembly being provided with regularly spaced holes 13 for the passage of hooks 14 which are suspended from cables 15. The cables pass around rollers 16 atop respective stakes 17 driven into the ground below the body of water W. The other ends of the cables 15 are attached to contractile springs 18 anchored to the ground outside the stakes 17. An outlet tube 19 extends from the bottom of the reservoir and is shown provided with a suction pump 20.

A set of weights 21 are peripherally disposed at the bottom of reservoir 10 to hold it submerged to a predetermined extent when little or no water is present therein, it being understood that the mass of these weights, the force of the coil springs 18 and the height of the stakes 17 must be so chosen that the reservoir will partly project above the level of water body W under all tidal conditions. Naturally, the elevation of the upper rim of the reservoir 10 above the water level must also be sufficient to prevent any waves from washing over the rim and contaminating its content.

When rain water collects in the reservoir, its bottom is lowered by the weight of the accumulated liquid against the force of springs 18 and the resiliency of its sidewalls. When the water level inside and outside the reservoir 10 is approximately the same, the pressure differential across its walls is substantially zero. Accumulation of additional liquid in the reservoir results in only a fractional rise of the inner level, owing to the yieldability of the moorings 14–18 and the extensibility of the sheet stored liquid is partly compensated by a rise of the bottom of the reservoir through the action of the corresponding restoring forces. Thus, little stress is exerted upon the reservoir walls which may therefore be made of relatively thin sheet material, e.g. a synthetic rubber known as Koroseal in a thickness of about 30 mils or less than 1 mm.

Owing to the resiliency of the sheet material and the relatively minor stresses acting thereon, the bottom of the reservoir 10 tends to preserve its substantially flat shape under various loading conditions so as to avoid damage by rocks and other surface irregularities of the underlying ground.

In order to restrict evaporation of the volume of liquid L within the reservoir, we prefer to float thereon a protective layer 22 which, as best seen in FIG. 2, may consist of an array of slabs of various configurations, preferably of foam plastic, interconnected by flexible links 23 and separated sufficiently to permit the passage of rain water into the space below.

FIG. 2 also illustrates the possibility of replacing the fixed stakes 17 by a floating frame 24 supported on corner buoys 25, the frame having outrigger sections 26 to which the springs 18 are anchored.

FIG. 3 illustrates the use of counterweights 27 in lieu of the springs 18. With these counterweights more or less submerged in the liquid body W in a partly filled state of the reservoir 10, additional liquid accumulation therein will result in an increase of the countervailing force exerted upon the suspension cables 15, thus providing a balancing force similar to that afforded by the springs 18 in FIGS. 1 and 2.

FIG. 4 shows a modified reservoir 10′ whose walls of flexible impervious sheet material are bent over at the top to form a floatable frame or wall 27 internally reinforced by bars or blocks 28 of buoyant solid material, such as foam polystyrene. A funnel-shaped cover 29 of similar sheet material, having a central aperture 30, is stretched across the frame 27 for the dual purpose of impeding evaporation of collected rain water and reinforcing the reservoir against the disruptive forces of wind and waves. The floating cistern 10′ is shown anchored at 31 to the ocean floor nad moored at 32 to a post ashore; this mode of attachment again allows the reservoir as a whole to rise and fall, according to the extent of liquid accumulation therein, although to a lesser extent than in the preceding embodiments on account of the weight of the solid frame members 28.

In FIG. 5 we show a similar floating cistern 10″ whose walls are pleated at 33 to enable expansion or contraction of its storage volume even if the impervious sheet material forming the reservoir is only of limited elasticity. The moorings, not shown, of this reservoir may again be attached to the solid, buoyant frame members 28. One or more auxiliary vessels 34 float alongside the reservoir 10″ and are detachably connected with respective conduits 35 including liquid pumps 36 which may be operated to drain the reservoir of part or all of its liquid and discharging same into the containers 34. These containers may themselves be made of rubber or other lightweight material, collapsible or not, and will be submerged to a greater or less extent in the surrounding liquid body W without ever sinking to the bottom, owing to the presence of residual air pockets or other buoyant material.

If the accumulating rain water is pumped out almost as rapidly as it collects, there is no need for providing evaporation-inhibiting means in the reservoir itself, such as the floating slabs 22 of FIGS. 1 and 2 or the funnel 29 of FIG. 4. Thus, the top of reservoir 10″ may be merely spanned by an open-mesh network of cords or cables 37, 38 designed to maintain the original (e.g. rectangular) outline of the cistern.

The floating containers 34—apart from having utility per se—could, of course, also be used with any of the cisterns shown in FIGS. 1—4 and, evidently, may be utilized for the storage of any kind of fluid in a body of surrounding liquid. They may be kept afloat, in partly or completely filled condition, for any length of time until their contents are needed on shore or elsewhere. The combined capacity of all these containers could be many times that of the floating cistern associated therewith.

Various other modifications, readily apparent to persons skilled in the art, are intended to be embraced within the spirit and scope of our invention as defined in our appended claims.

We claim:

1. A fresh-water cistern comprising a reservoir of impermeable sheet material at least partly open at the top and floating on a body of nonpotable water; mooring means peripherally supporting said reservoir with vertical mobility between predetermined limits of projection above the level of said body of water; and a layer of evaporation-impeding inert matter disposed in said reservoir for floating on liquid collected therein, said layer comprising an array of spacedly interconnected slabs.

2. A cistern as defined in claim 1 wherein said mooring means include weight means at the bottom of said reservoir and counterbalancing suspension means.

3. A cistern as defined in claim 1 wherein said sheet material is an elastomeric substance.

4. A cistern as defined in claim 1 wherein said slabs consist of foam plastic.

5. A cistern as defined in claim 1, further comprising funnel means with a restricted aperture spanning the top of said reservoir.

6. A cistern as defined in claim 1 wherein said reservoir is provided with a floatable frame surrounding its top.

7. A cistern as defined in claim 6, further comprising deformation-resistant reinforcing means spanning said frame.

8. In combination, a floating cistern as defined in claim 1; at least one auxiliary vessel floating alongside said cistern on said body of water; and conduit means for transferring fresh water from said cistern to said vessel for continued storage therein.

References Cited

UNITED STATES PATENTS

| | | | |
|---|---|---|---|
| 2,211,958 | 8/1940 | Mahaffey | 61—1 X |
| 3,230,967 | 1/1966 | Castro | 61—.5 X |
| 3,289,415 | 12/1966 | Merrill | 61—1 |
| 3,389,559 | 6/1968 | Logan | 61—1 |

PETER M. CAUN, Primary Examiner

U.S. Cl. X.R.

220—26